United States Patent
Deliz Centeno et al.

(10) Patent No.: US 12,177,274 B2
(45) Date of Patent: Dec. 24, 2024

(54) SYNCHRONIZATION IN A MULTIUSER EXPERIENCE

(71) Applicant: Apple Inc., Cupertino, CA (US)

(72) Inventors: Luis R. Deliz Centeno, Oakland, CA (US); Joseph P. Cerra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/410,466

(22) Filed: Jan. 11, 2024

(65) Prior Publication Data
US 2024/0187464 A1 Jun. 6, 2024

Related U.S. Application Data

(63) Continuation of application No. 18/189,403, filed on Mar. 24, 2023, now Pat. No. 11,909,791, which is a
(Continued)

(51) Int. Cl.
| | | |
|---|---|---|
| *H04L 65/403* | (2022.01) | |
| *G06T 7/70* | (2017.01) | |
| *G06T 19/00* | (2011.01) | |

(52) U.S. Cl.
CPC .............. *H04L 65/403* (2013.01); *G06T 7/70* (2017.01); *G06T 19/006* (2013.01); *G06T 2219/024* (2013.01)

(58) Field of Classification Search
None
See application file for complete search history.

(56) References Cited

U.S. PATENT DOCUMENTS

| | | |
|---|---|---|
| 9,602,556 B1 | 3/2017 | Cham |
| 2013/0031192 A1 | 1/2013 | Caspi |

(Continued)

FOREIGN PATENT DOCUMENTS

| | | |
|---|---|---|
| WO | 2017177019 A1 | 10/2017 |
| WO | 2019055703 A2 | 3/2019 |

OTHER PUBLICATIONS

He, et al., "Exploring Configurations for Multi-user Communication in Virtual Reality," arXiv:1911.06877v1, Nov. 15, 2019.
(Continued)

*Primary Examiner* — Toan H Vu
(74) *Attorney, Agent, or Firm* — Blank Rome LLP

(57) ABSTRACT

Facilitating collaboration in a multiuser communication session includes detecting initiation of an interaction between a user of a first device and a virtual object in a multiuser communication session, where the first device and a second device are active in the multiuser communication session, and where state information is synchronized among the first device and second device in the multiuser communication session. In accordance with detecting the initiation of an interaction between the user and the virtual object, synchronization of state information is suspended by the first device, where the state information is related to the interaction between the user and the virtual object. A representation of the multiuser communication session at the first device and a representation of the multiuser communication session at the second device are inconsistent in accordance with the suspended synchronization of the state information.

20 Claims, 8 Drawing Sheets

Related U.S. Application Data continuation of application No. PCT/US2021/050076, filed on Sep. 13, 2021.

(60) Provisional application No. 63/082,675, filed on Sep. 24, 2020.

(56) References Cited

U.S. PATENT DOCUMENTS

| | | | |
|---|---|---|---|
| 2014/0181683 A1* | 6/2014 | Lim | H04L 63/108 715/740 |
| 2015/0249714 A1 | 9/2015 | Vedula | |
| 2016/0086379 A1 | 3/2016 | Sadi | |
| 2016/0344808 A1 | 11/2016 | Smith | |
| 2017/0280188 A1* | 9/2017 | Mullins | H04N 21/4302 |
| 2019/0272674 A1 | 9/2019 | Comer | |
| 2019/0361589 A1 | 11/2019 | Yerli | |
| 2019/0391779 A1* | 12/2019 | Mouyade | G09G 5/12 |
| 2020/0043242 A1 | 2/2020 | Hu | |
| 2020/0159838 A1* | 5/2020 | Kikin-Gil | G10L 13/02 |
| 2022/0060368 A1 | 2/2022 | Caspi | |
| 2022/0368993 A1 | 11/2022 | Kim | |
| 2023/0308494 A1 | 9/2023 | Deliz Centeno | |

OTHER PUBLICATIONS

Mahmood, et al., "Improving Information Sharing and Collaborative Analysis for Remote GeoSpatial Visualization Using Mixed Reality," 2019 IEEE International Symposium on Mixed and Augmented Reality (ISMAR), DOI 10.1109/ISMAR.2019.00021.

* cited by examiner

SYNCHRONIZATION IN A MULTIUSER EXPERIENCE

BACKGROUND

This disclosure relates generally to image processing. More particularly, but not by way of limitation, this disclosure relates to techniques and systems for providing presentation state synchronization in a multiuser communication session.

Some devices are capable of generating and presenting extended reality (XR) environments. An XR environment may include a wholly or partially simulated environment that people sense and/or interact with via an electronic system. In XR, a subset of a person's physical motions or representations thereof are tracked, and in response, one or more characteristics of one or more virtual objects simulated in the XR environment are adjusted in a manner that comports with at least one law of physics. Some XR environments allow multiple users to interact with each other within the XR environment. However, when an XR environment is initiated, what is needed is an improved technique for synchronizing presentation state information across active devices in a multiuser communication session.

DETAILED DESCRIPTION

Figure 1:
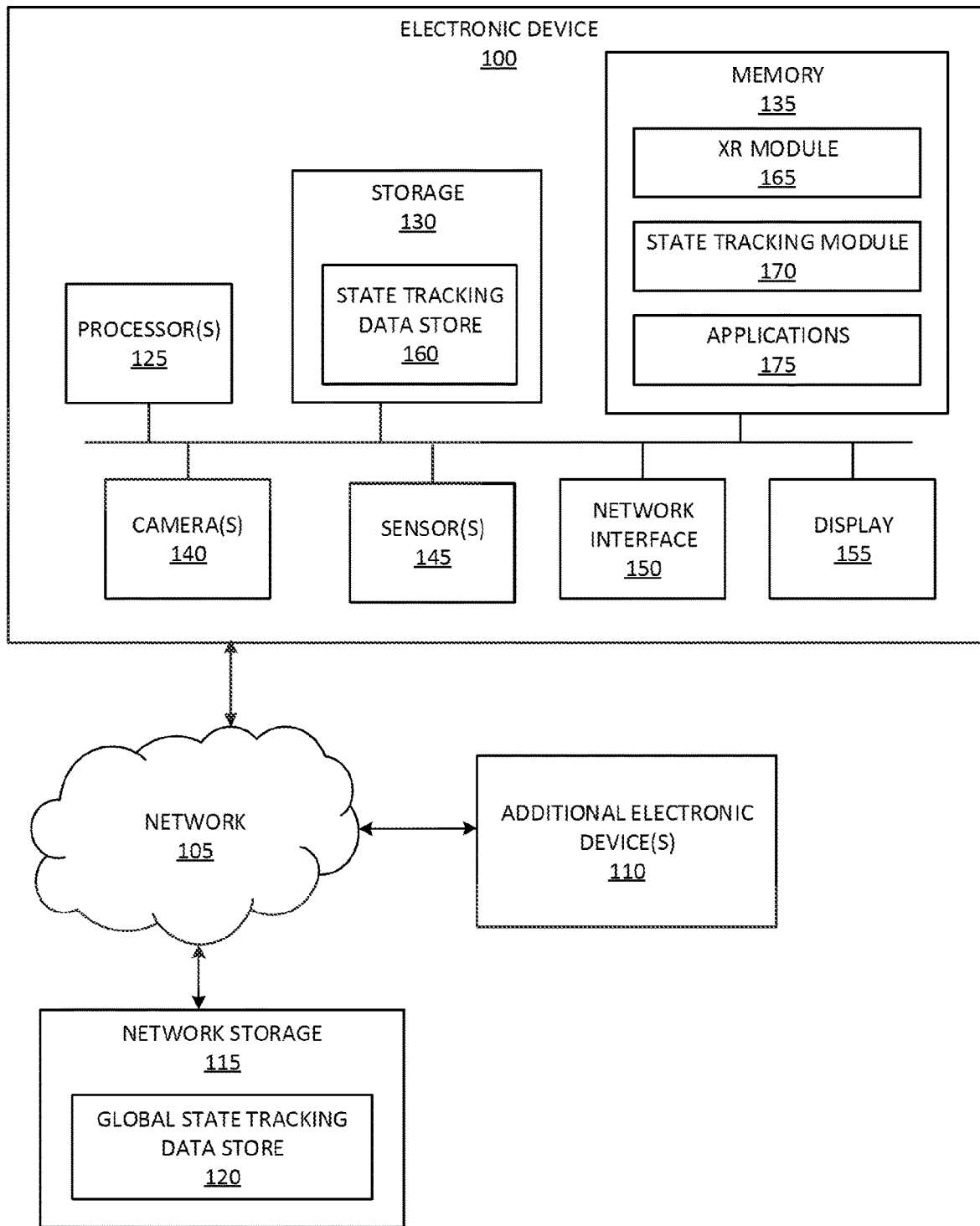
FIG. 1 shows, in block diagram form, exemplary systems for use in various XR technologies according to one or more embodiments.

This disclosure pertains to systems, methods, and computer-readable media to manage synchronization of presentation state information in which multiple user devices are active in a single multiuser communication session. According to one or more embodiments, virtual elements can be presented in a consistent manner across devices such that the presentation state of the virtual elements of the multiuser communication session appears in a consistent configuration across active devices. Presentation state information for active devices within the multiuser communication session may be dynamically shared such that the multiuser communication session provides an immersive experience, thus providing a synchronized environment among users. According to some embodiments, one or more users can opt to "break" synchronicity, either temporarily or for a longer period of time, such that a particular user views a particular presentation of the virtual objects differently than other users.

According to some embodiments, synchronization can be suspended in a number of ways. For example, automatically or based on user settings, a user interacting with a virtual object in such a way as to augment the presentation of the virtual object may trigger suspension of synchronization. Additionally, or alternatively, a particular user input or other trigger may trigger suspension of synchronization for a particular device. During suspension, a user may modify a presentation of one or more virtual objects in a shared multiuser communication session, without those modifications being visible to other users. Upon detection of a commit action by the user, the new presentation state may be propagated to other users in the multiuser communication session.

A person can interact with and/or sense a physical environment or physical world without the aid of an electronic device. A physical environment can include physical features, such as a physical object or surface. An example of a physical environment is a physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples includes heads-up displays (HUDs), head-mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head-mountable system can have one or more speaker(s) and an opaque display. Other head-mountable systems can be configured to accept an opaque external display (e.g., a smartphone). The head-mountable system can include one or more image sensors to capture images/video of the physical environment and/or one or more microphones to capture audio of the physical environment. A head-mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

In some embodiments, when synchronization of presentation state information is suspended for a local user, additional users may continue to interact with elements in the shared session. The local device may provide an indication that synchronization is suspended, such that the additional devices can indicate to their respective users that the local user is not experiencing the same representation of the multiuser communication session. Additionally, the local user may continue to receive presentation state information from remote users and optionally update the local presentation state while synchronization is suspended.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developer's specific goals (e.g., compliance with system- and business-related constraints) and that these goals may vary from one implementation to another. It will also be appreciated that such development efforts might be complex and time consuming but would nevertheless be a routine undertaking for those of ordinary skill in the design and implementation of graphics modeling systems having the benefit of this disclosure.

Referring to FIG. 1, a simplified block diagram of an electronic device 100 is depicted, communicably connected to additional electronic devices 110 and a network storage 115 over a network 105, in accordance with one or more embodiments of the disclosure. Electronic device 100 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 100, additional electronic device 110, and/or network storage 115 may additionally, or alternatively, include one or more additional devices within which the various functionality may be contained or across which the various functionality may be distributed, such as server devices, base stations, accessory devices, and the like. Illustrative networks, such as network 105 include, but are not limited to, a local network such as a universal serial bus (USB) network, an organization's local area network, and a wide area network such as the Internet. According to one or more embodiments, electronic device 100 is utilized to participate in a multiuser communication session in an XR environment. It should be understood that the various components and functionality within electronic device 100, additional electronic device 110 and network storage 115 may be differently distributed across the devices or may be distributed across additional devices.

Electronic device 100 may include one or more processors 125, such as a central processing unit (CPU). Processor(s) 125 may include a system-on-chip such as those found in mobile devices and include one or more dedicated graphics processing units (GPUs). Further, processor(s) 125 may include multiple processors of the same or different type. Electronic device 100 may also include a memory 135. Memory 135 may include one or more different types of memory, which may be used for performing device functions in conjunction with processor(s) 125. For example, memory 135 may include cache, ROM, RAM, or any kind of transitory or non-transitory computer-readable storage medium capable of storing computer-readable code. Memory 135 may store various programming modules for execution by processor(s) 125, including XR module 165, state tracking module 170, and other various applications 175. Electronic device 100 may also include storage 130. Storage 130 may include one more non-transitory computer-readable mediums, including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Storage 130 may be configured to store state tracking data 160, according to one or more embodiments. Electronic device 100 may additionally include network interface 150, from which additional network components may be accessed via network 105.

Electronic device 100 may also include one or more cameras 140 or other sensors 145, such as a depth sensor, from which depth or other characteristics of an environment may be determined. In one or more embodiments, each of the one or more cameras 140 may be a traditional RGB camera or a depth camera. Further, cameras 140 may include a stereo camera or other multicamera system, a time-of-flight camera system, or the like. Electronic device 100 may also include a display 155. The display device 155 may utilize digital light projection, OLEDs, LEDs, uLEDs, liquid crystal on silicon, laser scanning light source, or any combination of these technologies. Display device 155 may be utilized to present a representation of a multiuser communication session, including shared virtual elements within the multiuser communication session and other XR objects.

Storage 130 may be utilized to store various data and structures which may be utilized for providing state information in order to track an application and session state. Storage 130 may include, for example, state tracking data store 160. State tracking data store may be utilized to store state information for applications, such as applications 175, and/or multiuser communication sessions, in which multiple applications may execute. In accordance with one or more embodiments, the state tracking data store 160 may store state information from which an application and/or session may resume upon initialization.

According to one or more embodiments, memory 135 may include one or more modules that comprise computer-readable code executable by the processor(s) 125 to perform functions. The memory may include, for example, an XR module 165 which may be used to provide a multiuser communication session in an XR environment. The multiuser communication session XR environment may be a computing environment which supports a shared experience by electronic device 100 as well as additional electronic devices 110 within a multiuser communication session. In one or more embodiments, presentation state data may be stored occasionally, periodically, ongoing, in response to a trigger, in response to a synchronization trigger or a commit action, or in response to a request from another module or device. In one or more embodiments, presentation state information may also be stored in state tracking data store 160. In one or more embodiments, presentation state information may include data related to how virtual objects are presented in a representation of a multiuser communication session. The presentation state information may be associated with a presentation of one or more particular virtual objects or applications and/or a relative presentation of virtual objects or applications within a representation of a multiuser communication session. The presentation state information may be directed to modifications of a common representation of a multiuser communication session that arise because of actions because of a local user. Said another way, presentation state information may include data corresponding to how the multiuser communication session is presented that are attributable to a local user or device. In one or more embodiments, the state information may be stored locally at each system, such as electronic device 100 and additional electronic devices 110, and/or the state information may be stored in global state tracking data store 120 as part of network storage 115.

The state tracking module 170 may store presentation state information for electronic device 100 on an ongoing basis, on a periodic basis, based on user input, or based on automatic trigger, such as by detecting an application state saving event or a session state saving event, as will be described in greater detail below. In some embodiments, presentation state may be stored when synchronization is suspended. Applications 175 may include, for example, computer applications that may be experienced in an XR environment by multiple devices, such as electronic device 100 and additional electronic devices 110. In one or more embodiments, the applications 175 may respond to a request for state information from state tracking module 170 by providing presentation state information which indicates how the application is presented.

State tracking data store 160 may additionally store presentation state information received from other devices, such as additional electronic device(s) 110. In one or more embodiment, a presentation state of a particular device may be influenced by presentation state of other devices, such that presentation of components in the multiuser communication session is synchronized across devices. According to some embodiments, when synchronization is suspended at a particular device, the device may or may not continue to receive presentation state from other devices. Further, the device may or may not update a local presentation state based on presentation state from remote devices. Said another way, the suspension of synchronization may be two-directional, such that a local device suspends transmission of its own presentation state and also does not update its own presentation state with state information received from remote devices. The suspension of synchronization may also be one-directional, such that the local device continues to update a local presentation state based on state information received from other devices but does not transmit its own presentation state to the other devices or merely transmits an indication that the local presentation state synchronization is suspended.

In some embodiments, synchronization state may be resumed, for example, in response to a commit action or other synchronization trigger. Resuming synchronization state may include, for example, transmitting updated local presentation state information to other active devices in the multiuser communication session. Resuming synchronization may also include updating a local presentation based on presentation state information received from other devices. In one or more embodiments, the state tracking module 170 at any of the devices may determine an updated state for the device at which synchronization was suspended. The state tracking module 170 may further determine a presentation state at which synchronization was ceased. In some embodiments, a state tracking module may generate intermediate presentation states, for example, by interpolating frames or presentation data between presentation state synchronization being ceased and presentation synchronization being resumed.

Although electronic device 100 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, or some combination of the functionality of any of the components may be combined.

Figure 2:
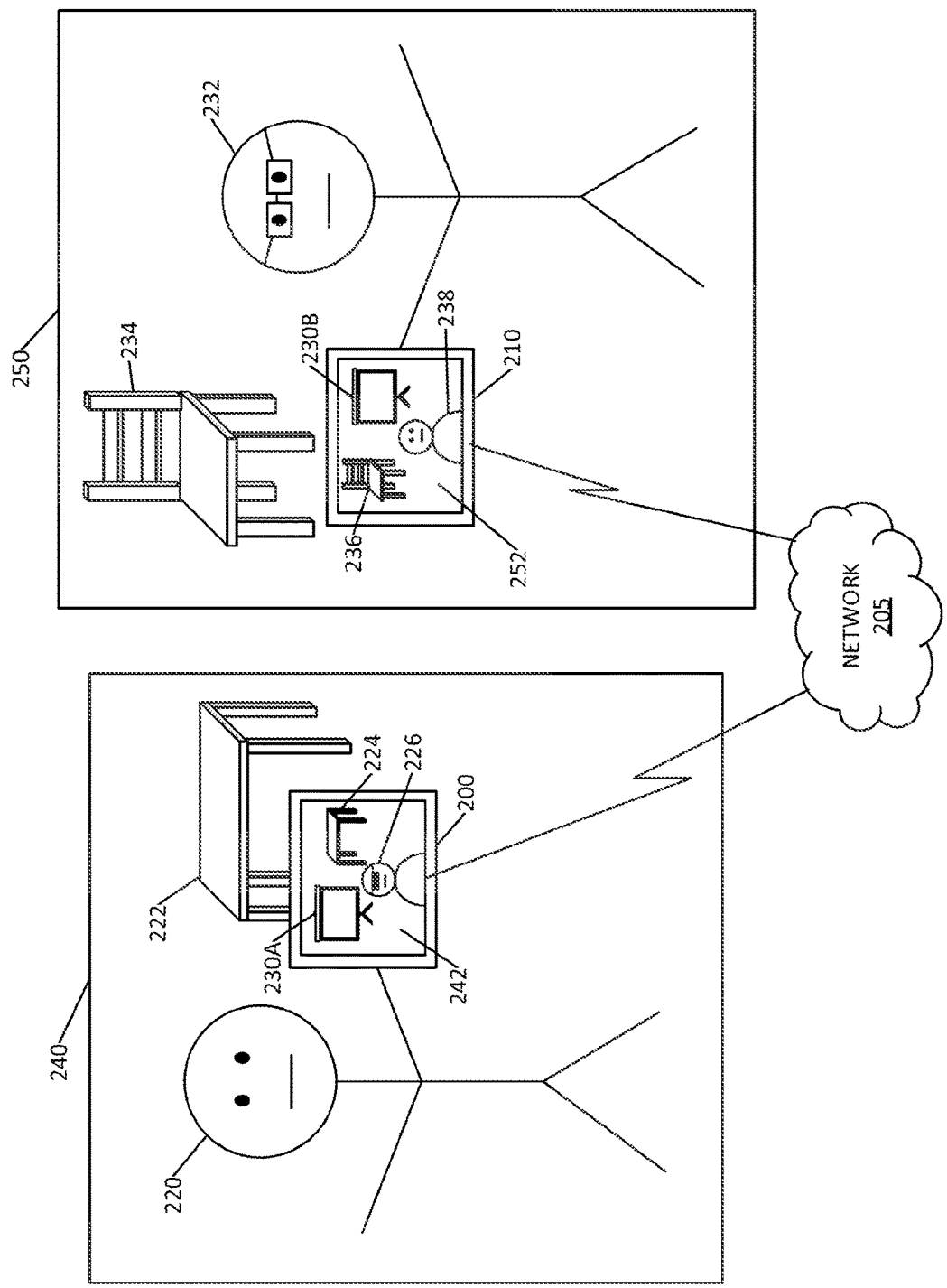
FIG. 2 shows a diagram of example operating environments, according to one or more embodiments.

FIG. 2 shows a diagram of example operating environments, according to one or more embodiments. While pertinent features are shown, those of ordinary skill in the art will appreciate from the present disclosure that various other features have not been illustrated for the sake of brevity and so as not to obscure more pertinent aspects of the example among implementations disclosed herein. To that end, as a nonlimiting example, the operating environment 240 includes a first physical environment, whereas operating environment 250 includes a second physical environment.

As shown in FIG. 2, the first environment 240 includes a first user 220 that is utilizing a first electronic device 200, and the second environment 250 includes a second user 232 that is utilizing a second electronic device 210. In one or more embodiments, the first electronic device 200 and the second electronic device 210 may correspond to mobile devices, such as handheld devices, wearable devices, and the like.

In one or more embodiments the first electronic device 200 and the second electronic device 210 communicate with each other via a network 205. Examples of network 205 may include, for example, the Internet, a wide area network (WAN), a local area network (LAN), etc. In one or more embodiments, the first electronic device 200 and the second electronic device 210 may be participating in a common multiuser communication session in an XR environment.

Although electronic device 200 and electronic device 210 may be participating in a common multiuser communication session, the XR environment may be presented differently on each device. As shown, the electronic device 200 may depict physical objects of the environment 240. As shown, physical table 222 may be depicted on the display 242 as a virtual table 224. In one or more embodiments, the display 242 may be a see-through display, and virtual table 224 may simply be a view of physical table 222 through display 242. As another example, the table or other surfaces may be presented in the form of a virtual surface, such as a plane. Dimensions of the physical object may be detected and saved, for example, as state information, without storing details about the specific table. In one or more embodiments, a privacy protecting abstraction layer may be applied by obtaining and storing limited information about real objects in a real environment.

Display 242 of electronic device 200 may also include an avatar 226 corresponding to user 232. For purposes of this disclosure, and avatar may include a virtual representation of a user. The avatar may depict real-time actions of the corresponding user 232, including movement, updated location, and/or interactions with various physical components and/or virtual components within the multiuser communication session XR environment. An avatar may or may not mimic physical characteristics of the user and may or may not mimic facial expressions of the user.

According to one or more embodiments, a multiuser communication session may support one or more multiuser communication applications or other modules which allow for depictions of shared virtual objects across all participating devices within a multiuser communication session, such as electronic device 200 and electronic device 210. As shown in display 242, presentation panel 230A is an example of a shared virtual object which may be visible to all participating devices.

As an example, returning to environment 250, electronic device 210 includes a display 252, on which the presentation panel virtual object 230B is depicted. It should be understood that in one or more embodiments, although the same ER object may be visible across all participating devices, the ER object may be rendered differently according to the location of the electronic device, the orientation of the electronic device, or other physical or virtual characteristics associated with electronic devices 200 and 210 and/or the multiuser communication session for which a representation is presented within displays 242 and 252.

Returning to environment 250, physical chair 234 is depicted as virtual chair 236. As described above, and in one or more embodiments, display 252 may be a see-through display, and virtual chair 236 may be a view of physical chair 234 through the see-through display 252. In addition, electronic device 210 depicts an avatar 238 corresponding to user 220. Another characteristic of a multiuser communication session XR environment is that while virtual objects may be shared across participating devices, physical worlds may appear differently. For instance, the XR environment depicted in display 242 includes presentation panel 230A that also appears in the XR environment depicted in display 252. However, the XR environment depicted in display 242 includes virtual table 224 which is a representation of physical table 222, which is not included in the XR environment depicted in display 252. Similarly, the XR environment depicted in display 252 includes representation 236 of physical chair 234, which is not included in the XR environment depicted in display 242.

According to one or more embodiments, the shared virtual objects, such as presentation panel 230, may be rendered as part of an application. In one or more embodiments, multiple applications may be executed within the multiuser communication session XR environment depicted in 242 and 252.

Figure 3:
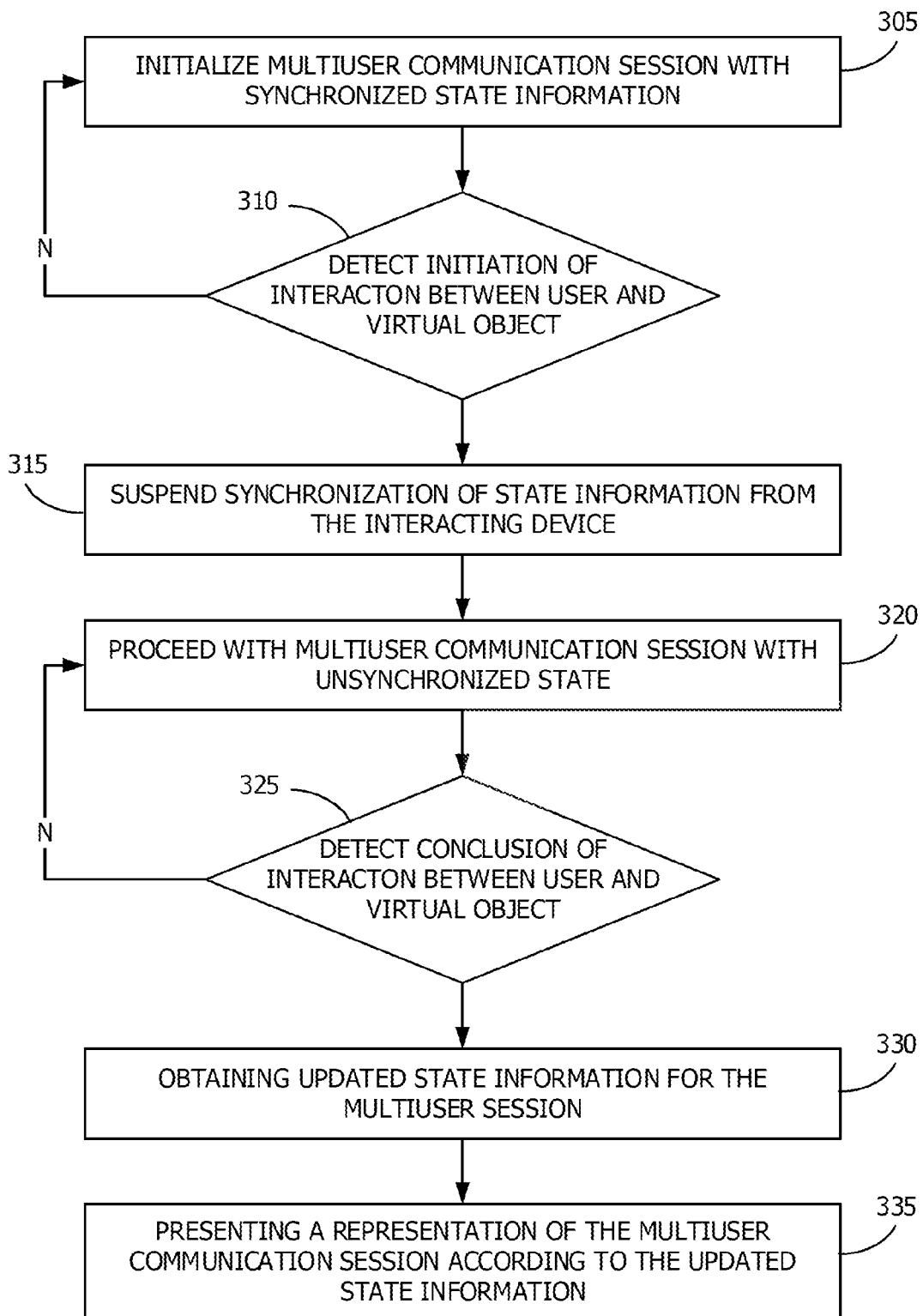
FIG. 3 shows a flowchart of a method for managing synchronization of presentation state information among active members of a multiuser communication session.

FIG. 3 shows a flowchart of a method for saving application and session state, according to one or more embodiments. For purposes of explanation, the flowchart is described utilizing example components from FIG. 1. Although the flowchart shows various procedures performed by particular components in a particular order, it should be understood that according to one or more embodiments, the various processes may be performed by alternative devices or modules. In addition, the various processes may be performed in an alternative order, and various combinations of the processes may be performed simultaneously. Further, according to some embodiments, one or more of the processes may be omitted, or others may be added.

FIG. 3 presents a technique for suspending and resuming synchronization of presentation state across active devices participating in a multiuser communication session. For purposes of clarity, the flowchart is described in relation to FIGS. 1-2. It should be understood that the various processes described may be performed in a different order, and some processes may be performed in parallel. Further, according to some embodiments, not all processes may be required.

FIG. 3 begins at block 305, where the XR module 165 initializes a multiuser communication session with synchronized state information. According to some embodiments, a multiuser communication session may include one or more devices between which a virtual environment and/or virtual content may be shared and experienced in a consistent manner.

The flowchart continues at block 310, where a determination is made as to whether the criteria is met for suspending synchronization of presentation state at a local device. In one or more embodiments, the criteria may be met based on a detected initiation of an interaction between a local user and a virtual object. For example, a user may begin interacting with a particular virtual object or application in the multiuser communication session but may not wish for the current representation to be presented globally. As an example, if a user picks up an object or otherwise selects an object for movement, that selection of the object may be considered to satisfy a suspension criteria such that while the user is moving the object for determining where to place the object, the intermediate movements are not synchronized among all users in the multiuser communication session.

The flowchart continues at 315, where the state tracking module 170 suspends synchronization of presentation state information from the local device. According to one or more embodiments, by suspending synchronization, the local device may suspend transmission of data related to a local presentation state. The local device may continue to receive presentation state information from remote devices while synchronization is suspended. Optionally, the local device may or may not utilize the received presentation state information to update a current presentation of the representation of the multiuser communication session. Some information may continue to be synchronized, such as information related to users joining or leaving the session or information related to applications utilized by others.

At block 320, the XR module 165 proceeds with a multiuser communication session with unsynchronized presentation. That is, the presentation of the representation of the multiuser communication session will appear differently to the local device as it will to one or more of the remote devices. As an example, if three devices are active in a multiuser communication session, the two remote devices may provide a view in which virtual objects are presented in a consistent manner, while the local device provides an inconsistent representation. In some embodiments, providing a presentation in a consistent matter includes presenting virtual and/or ER objects such that the content of the objects and/or a spatial relationship between the various objects appears the same among the devices with a consistent presentation, although the point of view among the devices with a consistent presentation may be different.

The flowchart continues to block 325, where a determination is made as to whether a committed action is detected. In some embodiments, the determination may include detecting a conclusion of an interaction between a user and a virtual object. The commit action may be any triggering criteria which causes resynchronization of the presentation state between the local user and additional users in the multiuser communication session. If a committed action is not detected, or if the criteria associated with resynchronization of the presentation state is not met, then the flowchart returns to block 320, and the XR module 165 proceeds with presenting the multiuser communication session with an unsynchronized presentation state when compared to other devices in the multiuser communication session.

Returning to block 325, if a determination is made that the commit action is detected, or the criteria for re-synchronizing the presentation information is otherwise met, then the flowchart continues to block 330. At block 330, the electronic device 100 obtains updated presentation state information for the multiuser session. In one or more embodiments, the electronic device 100 may continue to receive and store presentation state information from additional electronic devices 110 while synchronization is suspended. In these embodiments, the electronic device 100 may present the multiuser communication session without using at least a portion of the received presentation state information while synchronization is suspended. In some embodiments, the electronic device 100 may suspend request or receipt of presentation state information while synchronization is suspended. As such, obtaining updated presentation state information may include identifying a locally stored most recent presentation state from one or more additional electronic devices 110 or may include transmitting a request for updated presentation state information. As described above, the presentation state information from the remote devices may include information regarding a representation of virtual objects and/or applications presented in the multiuser communication session as the presentation is altered by way of the additional electronic devices 110. For example, presentation state information may include presentation characteristics that arise because of user interaction at the additional electronic devices 110 and/or modifications to the presentation of one or more virtual objects and/or applications as they automatically arise from activity at the additional electronic devices 110. In one or more embodiments, the various presentation state data may be managed remotely, such as by network storage 115. As such, in some embodiments, electronic device 100 may obtain the updated presentation state information from global state tracking data store 120.

The flowchart concludes at block 335, where the XR module 165 renders a presentation of the multiuser communication session according to the updated presentation state information. In one or more embodiments, the rendering of the presentation in accordance with the updated presentation state information causes the presentation of the multiuser communication session to be resynchronized such that the representation presented by electronic device 100 presents a consistent representation of the XR view with the additional electronic devices 110. In one or more embodiments, the electronic device 100 may additionally transmit updated presentation state information for the electronic device 100 such that the additional electronic devices 110 may additionally be synchronized such that some or all of the devices active in the multiuser communication session may present an updated synchronized view of the representation of the multiuser communication session.

Figure 4:
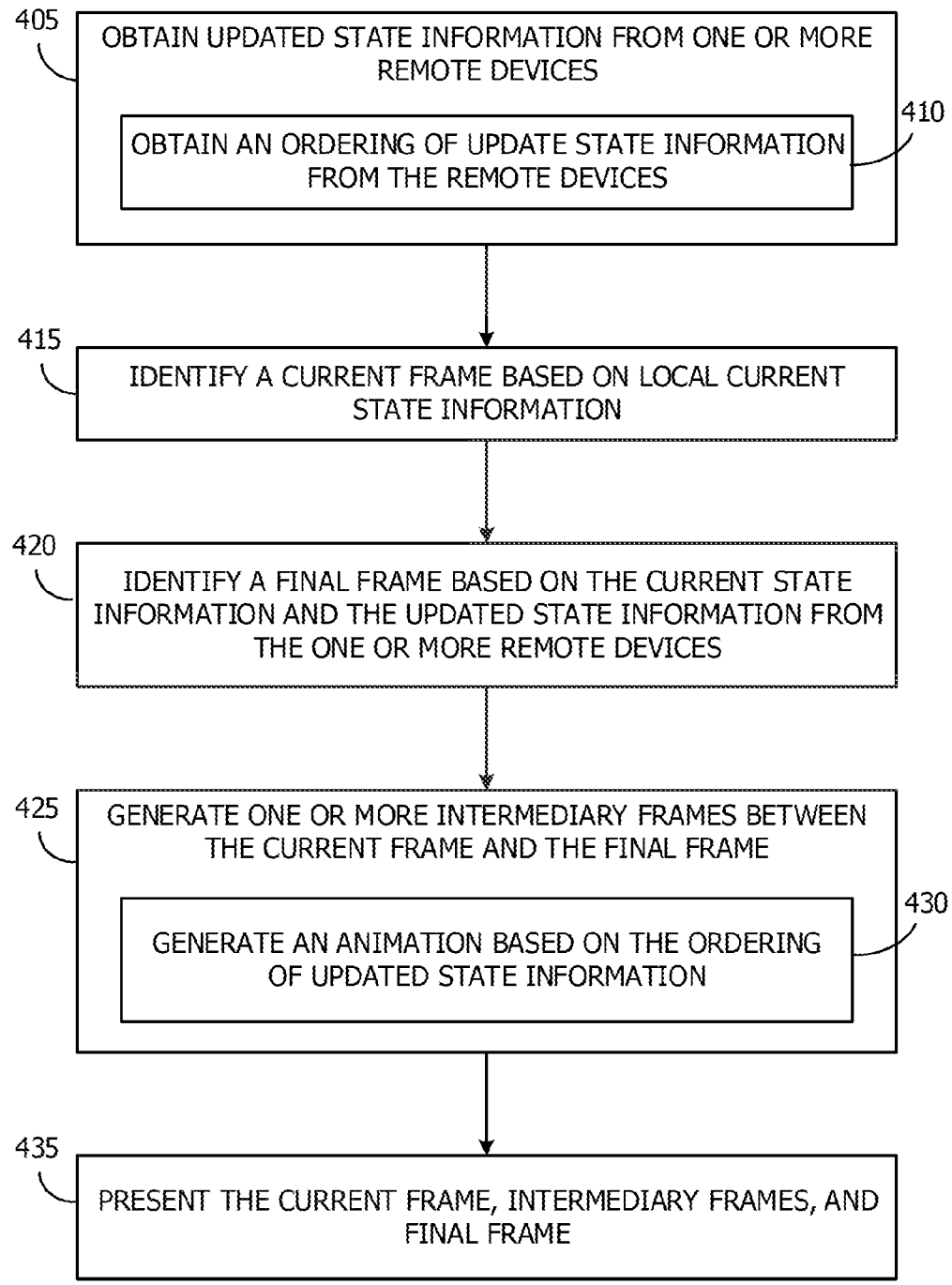
FIG. 4 shows a flowchart for re-synchronizing presentation state information among active members of a multiuser communication session, according to one or more embodiments.

FIG. 4 illustrates a technique for providing a transitional presentation from an unsynchronized view to a synchronized view of a multiuser communication session in accordance with one or more embodiments. For purposes of clarity, the flowchart is described in relation to FIGS. 1-2. It should be understood that the various processes described may be performed in a different order, and some processes may be performed in parallel. Further, according to some embodiments, not all processes may be required.

The flowchart begins at block 405, where the state tracking module 170 obtains updated presentation state information from one or more remote devices. As described above, during an unsynchronized presentation state, the electronic device 100 may continue to receive and store presentation state data in state tracking data store 160. In some embodiments, the electronic device 100 may suspend receipt of presentation state information from remote devices. As such, in some embodiments, obtaining updated presentation state information may include transmitting a request for updated state information to additional electronic devices 110. Further, in some embodiments, the presentation state information may be stored at least partially centrally, for example in network storage 115. As such, obtaining updated state information from one or more remote devices may include requesting or otherwise receiving presentation state information for the electronic devices 110 from global state tracking data store 120.

In some embodiments, presentation state information may be received from multiple electronic devices during the suspension of presentation state synchronization. In some embodiments, the presentation state information may be associated with metadata that describes the context at which the presentation state information was collected. For example, the presentation state information may be associated with the timestamp, an identifier of the device reporting the presentation state information, or other information which may be utilized to update and synchronize presentation state. In some embodiments, the transition from the unsynchronized state to the synchronized state may include a transitional presentation that depicts an ordering of events which augment presentation state. As such, in some embodiments, the state tracking module 170 may obtain an ordering of updated state information from the remote devices 110.

The flowchart continues at block 415, where the state tracking module 170 identifies a current frame based on a local current presentation state information. Said another way, the current frame is based on the latest synchronization presentation with other devices in the session. The flowchart continues at block 420, where the electronic device 100 identifies a final frame based on the current state information and the updated state information from the one or more remote devices. In one or more embodiments, the updated state information may additionally include an ordering of the updated presentation state which indicates the order in which presentation state was updated by the various remote devices. As described above, the final frame may include information regarding how a presentation of the representation of the multiuser communication session is modified or otherwise affected by the corresponding additional electronic devices 110.

At block 425, the XR module 165 generates one or more intermediary frames between the current frame and the final frame for presentation at the local device. In one or more embodiments, the intermediary frames may include intermediary presentation information which may or may not be received from the additional electronic devices 110. As an example, the intermediary frames are based on presentation information that may be generated, interpolated, or the like by the additional electronic devices 110. As such, the intermediary frames may or may not align with an actual intermediary action between when presentation state information ceased being synchronized and when synchronization resumed.

In some embodiments, at block 430, an animation is generated based on the ordering of updated state information. As such, when a local user resynchronizes a presentation of the multiuser communication session, the XR module 165 may provide an animation giving context as to how the current representation came to be. As an example, an avatar corresponding to a first user may be depicted moving a virtual object from a first location to a second location, then an avatar corresponding to a second user may be shown moving the same virtual object from the second location to a third location, wherein the third location is consistent with the presentation of the virtual object by the devices for the first and second users.

The flowchart concludes at block 435, where the XR module 165 presents the current frame, intermediary frames, and the final frame. As such, a user at electronic device 100 may experience a representation of activities that occurred within the multiuser communication session while the synchronization was suspended. Thus, upon presentation of the current frame, intermediary frames, and final frame, the state tracking module 170 and XR module 165 may proceed with synchronized presentation state information. In some embodiments, additional interpolations may be performed to handle frames that have occurred in the multiuser communication session during presentation of the intermediary frames.

Figure 5:
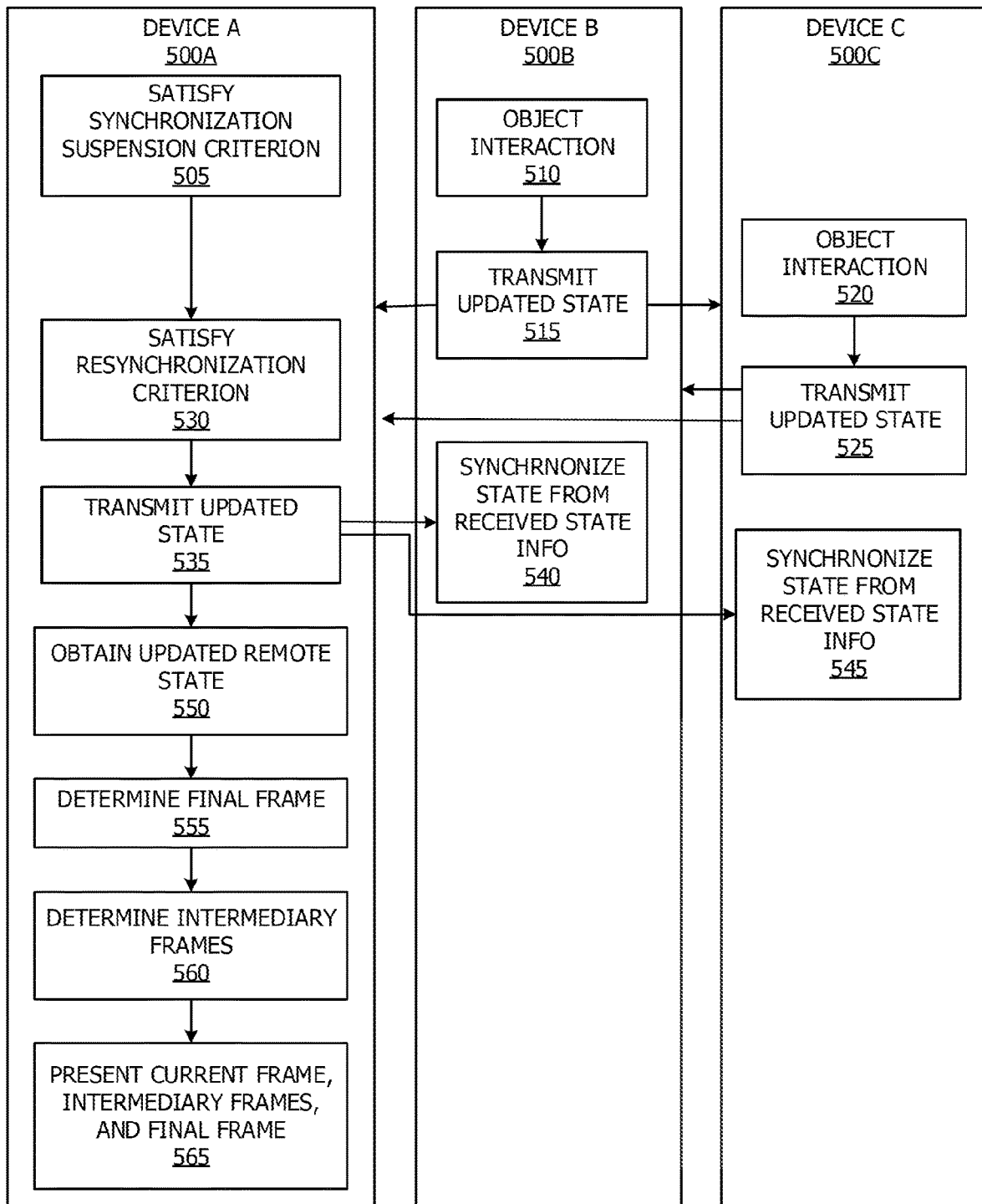
FIG. 5 shows an example timing diagram of a technique for synchronizing presentation state information, in accordance with one or more embodiments.

FIG. 5 depicts a flow diagram for data transmission among multiple devices in a multiuser communication session in which presentation state information is suspended and then synchronized at one device. The example diagram of FIG. 5 is intended to be merely one example of some of the described embodiments.

The flowchart diagram includes device A 500A, device B 500B, and device C 500C. Devices 500A-C are active in a multiuser communication session. The flow diagram begins at block 505, where device A 500A satisfies a synchronization suspension criterion. In some embodiments, device A 500A initiates object interaction with the virtual object in the multiuser communication session, thereby suspending presentation synchronization. According to one or more embodiments, the initiation of the object interaction may satisfy synchronization suspension criteria such that the initiation of the interaction causes presentation synchronization to be suspended at device A 500A. It should be understood that the synchronization suspension criteria may be any number of other characteristics, such as a particular predetermined user interaction, a request by a user, a particular state of an application or object in the multiuser communication session, and the like. The flow diagram continues at block 530, where a resynchronization criterion is satisfied. For example, a resynchronization criterion may be satisfied if an object interaction is complete. According to some embodiments, the completion of the object interaction may satisfy the resynchronization criteria; however, it should be understood that the resynchronization criteria may be met by any other number of characteristics and or triggering events.

Meanwhile, at device B 500B, object interaction may occur at block 510. In some embodiments, the object interaction at block 510 may cause a presentation of the representation of the multiuser communication session to be augmented or modified in some way in accordance with the object interaction. At block 515, device B 500B may transmit the updated presentation state. As described above, the updated presentation state may include an indication of how a presentation of the multiuser communication session is augmented or modified in accordance with the object interaction that occurred at block 510. In some embodiments, the updated presentation state may be transmitted to device A 500A and device C 500C such that device A 500A and device C 500C have the capability of updating their own presentation of the multiuser communication session to be consistent with that of device B 500B. In some embodiments, device A 500A may receive the transmitted updated state information transmitted at block 515 even though synchronization is suspended. In accordance with some embodiments, the device A 500A may store the received updated presentation state for later use. In one or more embodiments, the device A 500A may not receive the updated presentation state information until it requests updated presentation state information from device B 500B upon resynchronization of the presentation state at device A 500A.

Similarly, at device C 500C, an object interaction may occur at block 520, and device C 500C may transmit updated presentation state information at block 525. As an example, the updated presentation state information transmitted at block 525 may be associated with modifications or augmentations to the representation of the multiuser communication session that arise from the object interaction at block 520.

Returning to device A 500A, the flow diagram continues at block 535, where the state tracking module 170 transmits updated presentation state information. Similarly as described above, the updated presentation state information transmitted at block 535 may be data corresponding to a change in the presentation of the representation of the multiuser communication session that arose from the object interaction associated with block 510 and 520.

Returning yet again to device B 500B, at block 540, the device may synchronize presentation state from the received updated presentation state information. For example, device B 500B may update the representation of the multiuser communication session in accordance with updated presentation state information received from device A 500A in the transmission that occurred at block 535 as well as the updated presentation state information received from the transmission that occurred at block 525. Similarly, at block 545, device C 500C may also synchronize presentation state from received presentation state information from device A 500A and device B 500B. As such, device C 500C may also generate a representation of the multiuser communication session that is consistent with that of device A 500A and device B 500B.

Once again returning to device 500A, at block 550, updated remote presentation state information is received or otherwise obtained. According to some embodiments, the updated remote presentation state information may be obtained from a local storage and the situation in which the presentation state information was previously transmitted. In alternative embodiments, the updated remote presentation state information may be obtained by requesting updated presentation state information from the additional electronic devices, including device B 500B and device C 500C. As described above, the updated remote presentation state information may include some or all presentation state information that was provided by device B 500B and device C 500C while presentation state synchronization was suspended at device A 500A. Further, in some embodiments, the updated remote presentation state may be determined to be in a particular order. Said another way, the presentation state from the various additional devices may be associated with a timestamp or other data from which an ordering of presentation states may be determined.

The flow diagram continues at block 555, where the device A 500A determines a final frame. The final frame may refer to final presentation at which point the presentation state will be synchronized with the presentation state of the additional remote devices. As such, the final frame may correspond to presentation data that takes into consideration the local current presentation state as well as the updated remote presentation state obtained at block 550.

The flow diagram continues at block 560, where the device A 500A determines intermediary frames. The intermediary frames may correspond to intermediary presentation information between the last synchronized presentation state from the remote electronic devices, including device B 500B and device C 500C, and the obtained updated remote presentation state information received at block 550. The intermediary frames determined at block 560 may be determined in any number of ways. For example, the intermediary frames may include interpolated frames between the presentation state at the completion of the object interactions at blocks 510 and 520 and the final frame at block 555. In some embodiments, the intermediary frames determined at block 560 may incorporate some or all intermediary presentation data received from device B 500B and device C 500C, including some or all presentation data corresponding to the object interaction at blocks 510 and 520.

The flow diagram concludes at 565, where device A 500A presents the current frame, intermediary frames, and final frame. Accordingly, a user of device A 500A may perceive or otherwise experience a transitional flow between the last synchronized presentation state of the multiuser communication session and the current presentation state of the multiuser communication session. Moreover, the series of frames presented provides context as to what happened within the multiuser communication session while the synchronization of presentation state information was interrupted.

Figure 6:
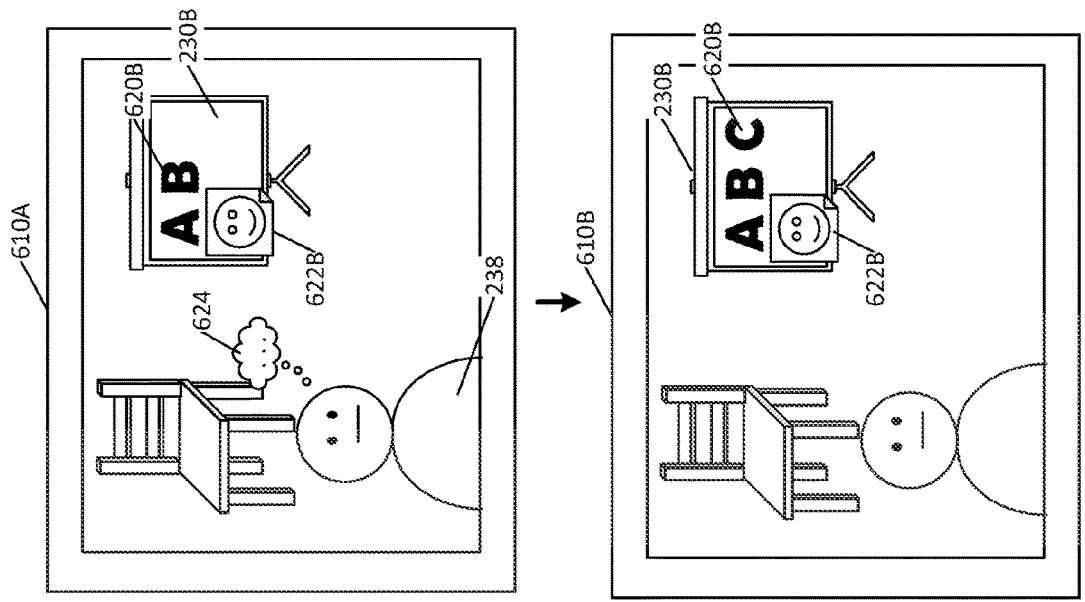
FIG. 6 shows example operation environments of different points of synchronization of presentation state information, in accordance with one or more embodiments.
Figure 6:
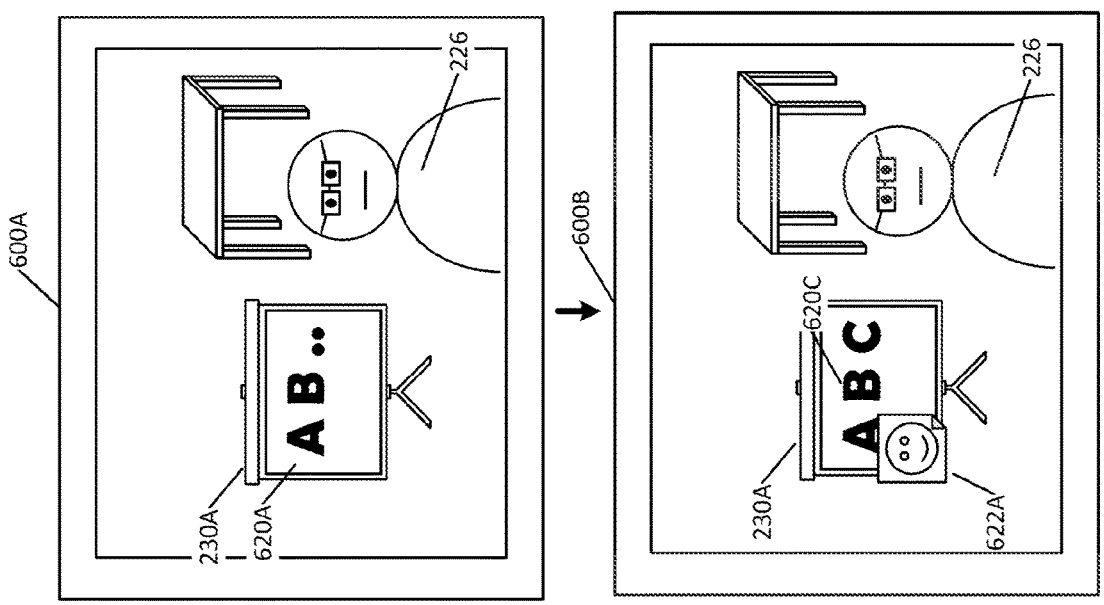

FIG. 6 shows example representations of the multiuser communication session in which device 600 and device 610 are active. For purposes of explanation, the example environments depicted are associated with the various components and modules described above with respect to FIG. 2. Specifically, the view shown at 600A and 600B are associated with device 200 utilized by user 220, as shown in FIG. 2. Similarly, the views in 610A and 610B are associated with those presented by device 210 utilized by user 232 as shown in FIG. 2. For purposes of the example, the example display shown at 600A and 610A depict representations of the multiuser communication session on the two devices at a first time, and the example displayed shown at 600B and 610B depict representations of the multiuser communication session on the two devices at a second time.

The view depicted at 600A shows a representation of the multiuser communication session as it is viewed by user 220 on device 200. For purposes of the example, a user 220 is depicted as modifying text 620A on virtual object 230A. As depicted, avatar 226 is also visible in the representation of the multiuser communication session and is representative of user 232 in the multiuser communication session. For purposes of this example, the modification of the text 620A may trigger suspension of synchronization of presentations state by device 200.

At the same time, user 232 is presented with presentation 610A, which includes a corresponding representation of the same multiuser communication session as that is described above with respect to 600A. According to one or more embodiments, user 220 is presented as avatar 238 in the representation of the multiuser communication session 610A. In some embodiments, when a user triggers suspension of synchronization of a presentation state, or synchronization of presentation state is otherwise suspended at a remote device, a visual identifier may be displayed with the associated avatar in the environment to alert other users in the multiuser communication session that the representation of the multiuser communication session may not be consistent across the corresponding devices. As such, in the visual presentation 610A, a graphical indication 624 is presented in conjunction with avatar 238 indicating that the user corresponding with avatar 238 may have a different view of the representation of the multiuser communication session than the local user 232. As such, the text 620B differs slightly from text 620A because it is not presented in a consistent manner. Said another way, presentation state information associated with text 620A and text 620B differs between device 200 and device 210 because synchronization has been suspended at device 200.

Synchronization may be suspended in association with one or more particular virtual objects or applications in the space which are affected by the triggering user interaction or other device activity. In addition, the user 232 may continue to make modifications to the presentation of the multiuser communication session, such as adding a note 622B to the virtual object 230B. Notably, the note 622B is not represented in the representation of the multiuser communication session at 600A, because in 600B presentation state is not synchronized.

For purposes of the example, a commit trigger may be activated between the representation indicated at 600A and the representation indicated at 600B. For example, user 220 may discontinue modifying virtual object 230A and/or may complete the addition of text 620A. As such, the representation indicated at 600B shows the completed text 620C, and in addition, because synchronization is reinstated across device 210, the representation 600B is updated to include the note 622A, which had previously been added onto virtual object 230B as note 622B by user 232 while synchronization was suspended.

Notably, because synchronization has been reinstated, the representation displayed at 610B is consistent with the representation presented at 600B. As such, representation at 610B also includes the virtual object 230B with the full text 620B corresponding to the modifications made by user 220 during the suspension of synchronization. As shown, representations of the multiuser communication session may be consistent across devices when the presentation of the shared virtual objects appears in a consistent manner; however, the representations may not be identical. In some embodiments, representations may be consistent when the virtual objects are presented with the same content and/or with a same relative configuration across multiple devices. Thus, in the example shown, the content of the virtual objects 230 includes the text 620 and the note 622, and in addition, the text and note are displayed in relation to each other in a same manner. However, the virtual object 230A appears on the left side of the display and device 200, while the virtual object 230B is displayed on the right side of the display of device 210. As such, the virtual object 230 is displayed consistently, although not identically.

Figure 7A:
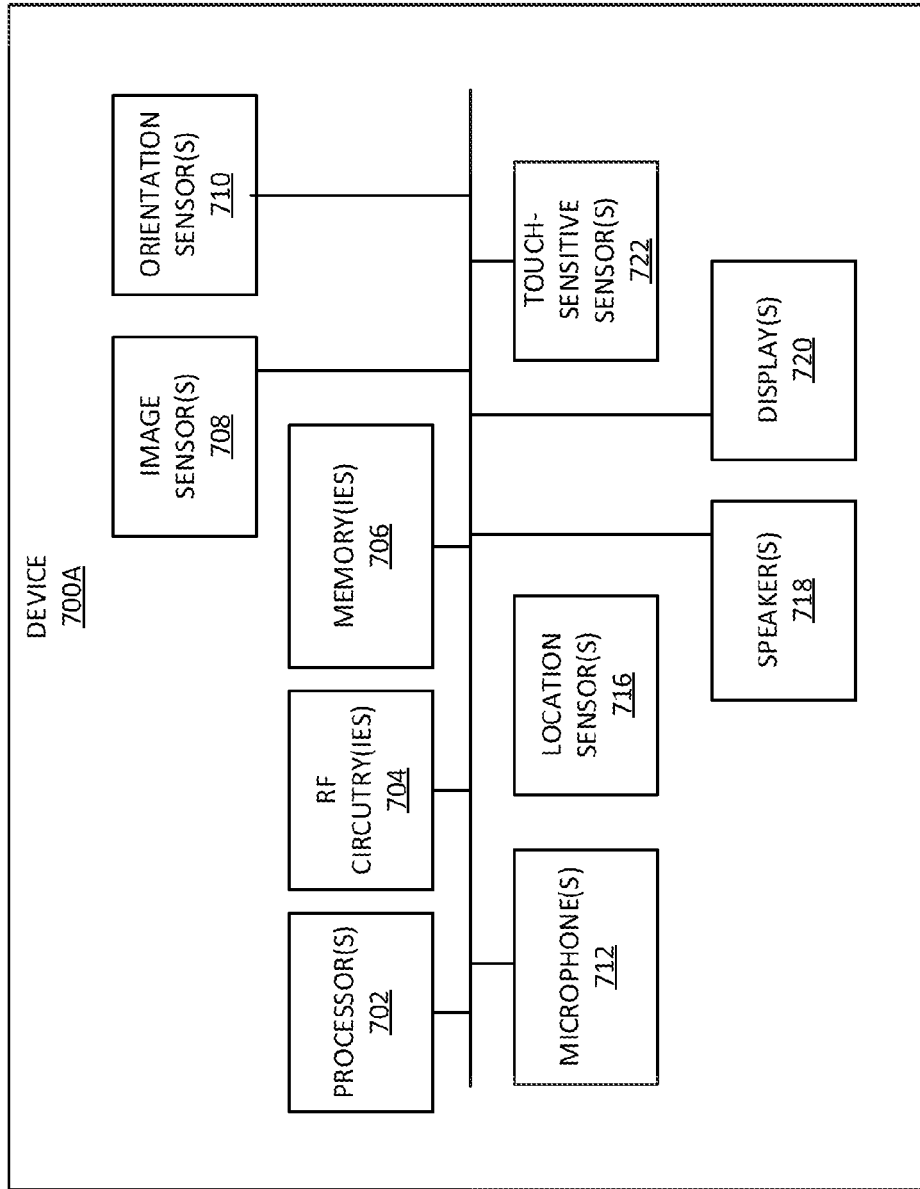
FIGS. 7A and 7B show, in block diagram form, exemplary systems for use in various XR technologies according to one or more embodiments.
Figure 7B:
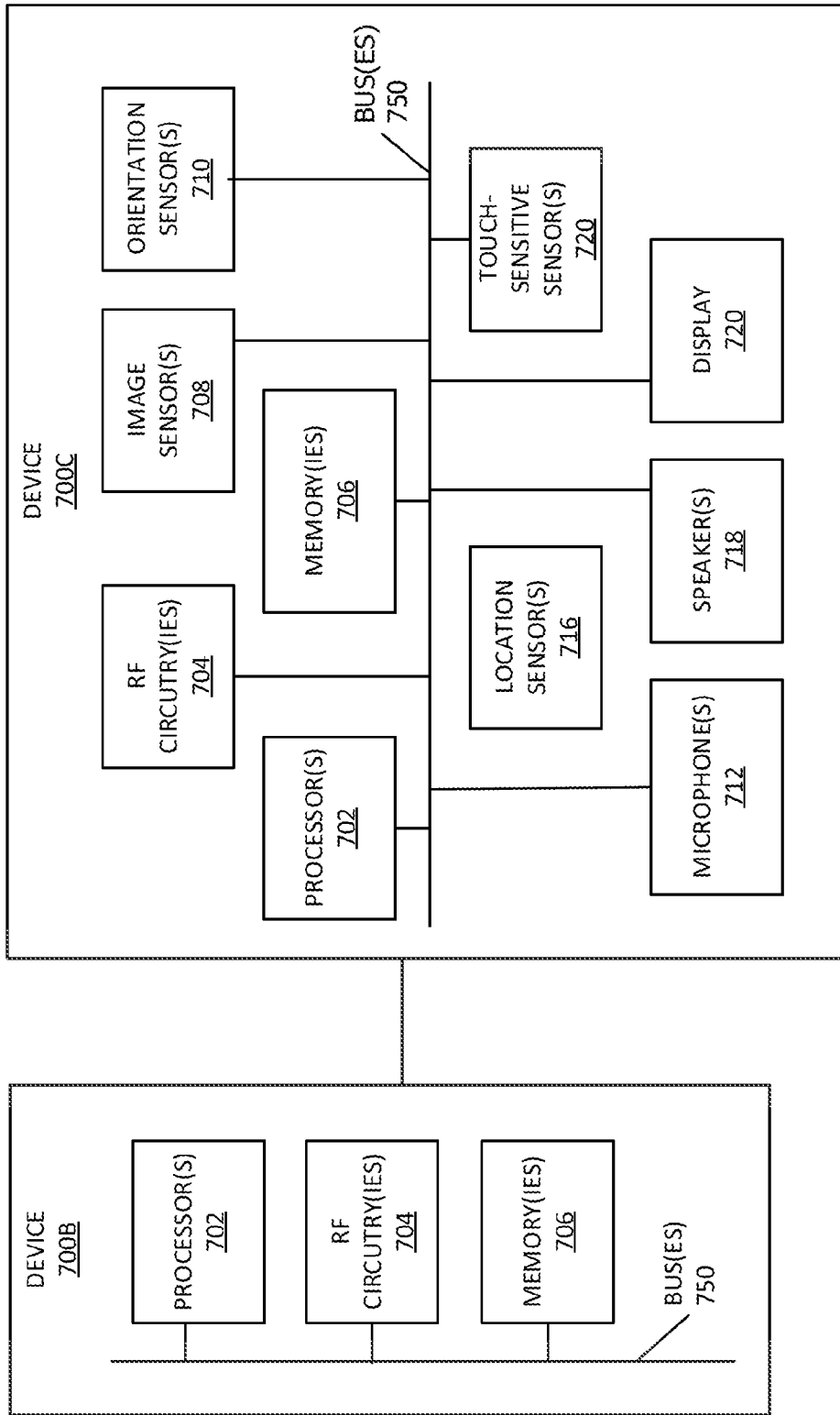

FIG. 7A and FIG. 7B depict exemplary system 700 for use in various XR technologies.

In some examples, as illustrated in FIG. 7A, system 700 includes device 700A. Device 700A includes various components, such as processor(s) 702, RF circuitry(ies) 704, memory(ies) 706, image sensor(s) 708, orientation sensor(s) 710, microphone(s) 712, location sensor(s) 716, speaker(s) 718, display(s) 720, and touch-sensitive surface(s) 722. These components optionally communicate over communication bus(es) 750 of device 700A.

In some examples, elements of system 700 are implemented in a base station device (e.g., a computing device, such as a remote server, mobile device, or laptop) and other elements of system 700 are implemented in a second device (e.g., a head-mounted device). In some examples, device 700A is implemented in a base station device or a second device.

As illustrated in FIG. 7B, in some examples, system 700 includes two or more devices in communication, such as through a wired connection or a wireless connection. First device 700B (e.g., a base station device) includes processor(s) 702, RF circuitry(ies) 704, and memory(ies) 706. These components optionally communicate over communication bus(es) 750 of device 700B. Second device 700C (e.g., a head-mounted device) includes various components, such as processor(s) 702, RF circuitry(ies) 704, memory(ies) 706, image sensor(s) 708, orientation sensor(s) 710, microphone(s) 712, location sensor(s) 716, speaker(s) 718, display(s) 720, and touch-sensitive surface(s) 722. These components optionally communicate over communication bus(es) 750 of device 700C.

System 700 includes processor(s) 702 and memory(ies) 706. Processor(s) 702 include one or more general processors, one or more graphics processors, and/or one or more digital signal processors. In some examples, memory(ies) 706 are one or more non-transitory computer-readable storage mediums (e.g., flash memory, random access memory) that store computer-readable instructions configured to be executed by processor(s) 702 to perform the techniques described below.

System 700 includes RF circuitry(ies) 704. RF circuitry(ies) 704 optionally include circuitry for communicating with electronic devices, networks such as the Internet, intranets, and/or a wireless network such as cellular networks and wireless local area networks (LANs). RF circuitry(ies) 704 optionally includes circuitry for communicating using near-field communication and/or short-range communication, such as Bluetooth®.

System 700 includes display(s) 720. Display(s) 720 may have an opaque display. Display(s) 720 may have a transparent or semi-transparent display that may incorporate a substrate through which light representative of images is directed to an individual's eyes. Display(s) 720 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 720 include heads-up displays, automotive windshields with the ability to display graphics, windows with the ability to display graphics, lenses with the ability to display graphics, tablets, smartphones, and desktop or laptop computers. Alternatively, system 700 may be designed to receive an external display (e.g., a smartphone). In some examples, system 700 is a projection-based system that uses retinal projection to project images onto an individual's retina or projects virtual objects into a physical setting (e.g., onto a physical surface or as a hologram).

In some examples, system 700 includes touch-sensitive surface(s) 722 for receiving user inputs, such as tap and swipe inputs. In some examples, display(s) 720 and touch-sensitive surface(s) 722 form touch-sensitive display(s).

System 700 includes image sensor(s) 708. Image sensors(s) 708 optionally include one or more visible light image sensor, such as charged coupled device (CCD) sensors, and/or complementary metal-oxide-semiconductor (CMOS) sensors operable to obtain images of physical elements from the physical setting. Image sensor(s) 708 also optionally include one or more infrared (IR) sensor(s), such as a passive IR sensor or an active IR sensor for detecting infrared light from the physical setting. For example, an active IR sensor includes an IR emitter, such as an IR dot emitter, for emitting infrared light into the physical setting. Image sensor(s) 708 optionally include one or more event camera(s) configured to capture movement of physical elements in the physical setting. Image sensor(s) 708 also optionally include one or more depth sensor(s) configured to detect the distance of physical elements from system 700. In some examples, system 700 uses CCD sensors, event cameras, and depth sensors in combination to detect the physical setting around system 700. In some examples, image sensor(s) 708 include a first image sensor and a second image sensor. The first image sensor and the second image sensor are optionally configured to capture images of physical elements in the physical setting from two distinct perspectives. In some examples, system 700 uses image sensor(s) 708 to receive user inputs, such as hand gestures. In some examples, system 700 uses image sensor(s) 708 to detect the position and orientation of system 700 and/or display(s) 720 in the physical setting. For example, system 700 uses image sensor(s) 708 to track the position and orientation of display(s) 720 relative to one or more fixed elements in the physical setting.

In some examples, system 700 includes microphones(s) 712. System 700 uses microphone(s) 712 to detect sound from the user and/or the physical setting of the user. In some examples, microphone(s) 712 include an array of microphones (including a plurality of microphones) that optionally operate in tandem, such as to identify ambient noise or to locate the source of sound in space of the physical setting.

System 700 includes orientation sensor(s) 710 for detecting orientation and/or movement of system 700 and/or display(s) 720. For example, system 700 uses orientation sensor(s) 710 to track changes in the position and/or orientation of system 700 and/or display(s) 720, such as with respect to physical elements in the physical setting. Orientation sensor(s) 710 optionally include one or more gyroscopes and/or one or more accelerometers.

The techniques defined herein consider the option of obtaining and utilizing a user's personal information. For example, such personal information may be utilized in order to provide a multi-user communication session on an electronic device. However, to the extent such personal information is collected, such information should be obtained with the user's informed consent, such that the user has knowledge of and control over the use of their personal information.

Parties having access to personal information will utilize the information only for legitimate and reasonable purposes, and will adhere to privacy policies and practices that are at least in accordance with appropriate laws and regulations. In addition, such policies are to be well-established, user-accessible, and recognized as meeting or exceeding governmental/industry standards. Moreover, the personal information will not be distributed, sold, or otherwise shared outside of any reasonable and legitimate purposes.

Users may, however, limit the degree to which such parties may obtain personal information. The processes and devices described herein may allow settings or other preferences to be altered such that users control access of their personal information. Furthermore, while some features defined herein are described in the context of using personal information, various aspects of these features can be implemented without the need to use such information. As an example, a user's personal information may be obscured or otherwise generalized such that the information does not identify the specific user from which the information was obtained.

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 3-5 or the arrangement of elements shown in FIGS. 1, 2, and 6-7 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain English equivalents of the respective terms "comprising" and "wherein."

The invention claimed is:

1. A method for facilitating collaboration in a multiuser communication session, comprising:
   providing, at a first device, a first representation of a multiuser communication session in which the first device and a second device are active;
   synchronizing the first representation of the multiuser communication session at the first device with a second representation of the multiuser communication session at the second device by providing, to the second device, state information for the first representation of the multiuser communication session, wherein components of the multiuser communication session are presented consistently among the first device and the second device in accordance with the synchronization;
   detecting, at the first device, initiation of an interaction in the first representation of the multiuser communication session satisfying a synchronization suspension criterion; and
   in accordance with detecting the initiation of the interaction satisfying the synchronization suspension criterion, ceasing to provide the state information to the second device to suspend synchronization, wherein the components of the first representation of the multiuser communication session and the second representation of the multiuser communication session are inconsistently presented in accordance with the first device ceasing to provide the state information.

2. The method of claim 1, wherein the state information comprises object state information associated with a presentation state of a virtual object in the multiuser communication session.

3. The method of claim 1, wherein the state information comprises user state information, the method further comprising:
   in accordance with detecting a change in location of a user of the first device, transmitting updated user state information associated with an updated location to the second device.

4. The method of claim 1, further comprising:
   in accordance with detecting completion of the interaction, obtaining updated state information for the second device; and
   presenting an updated representation of the multiuser communication session in accordance with the updated state information for the second device.

5. The method of claim 4, further comprising:
   further in accordance with detecting completion of the interaction, obtaining an updated presentation state for a third device active in the multiuser communication session.

6. The method of claim 4, wherein presenting the updated representation comprises:
   interpolating one or more intermediary frames between a current representation of the multiuser communication session at the first device and an updated representation of the multiuser communication session for the second device.

7. The method of claim 4, wherein the completion of the interaction is detected based on determining an elapsed time since the interaction satisfies a predetermined threshold.

8. A non-transitory computer readable medium comprising computer readable code executable by one or more processors to:
   provide, at a first device, a first representation of a multiuser communication session in which the first device and a second device are active;
   synchronize the first representation of the multiuser communication session at the first device with a second representation of the multiuser communication session at the second device by providing, to the second device, state information for the first representation of the multiuser communication session, wherein components of the multiuser communication session are presented consistently among the first device and the second device in accordance with the synchronization;

detect, at the first device, initiation of an interaction in the first representation of the multiuser communication session satisfying a synchronization suspension criterion; and in accordance with detecting the initiation of the interaction satisfying the synchronization suspension criterion, cease providing the state information to the second device to suspend synchronization, wherein the components of the first representation of the multiuser communication session and the second representation of the multiuser communication session are inconsistently presented in accordance with the first device ceasing to provide the state information.

9. The non-transitory computer readable medium of claim 8, further comprising computer readable code to:

in accordance with detecting completion of the interaction and determining that the first device is authorized to globally update a state of the multiuser communication session, transmit a current state of the first representation of the multiuser communication session for the first device to the second device.

10. The non-transitory computer readable medium of claim 8, further comprising computer readable code to:

in accordance with detecting the initiation of the interaction, transmit an indication of the suspended synchronization of the state information to the second device.

11. The non-transitory computer readable medium of claim 8, wherein the interaction comprises an interaction between a user of the first device and a virtual object, and wherein a representation of the user and the virtual object in the multiuser communication session at the second device is inconsistent with the interaction of the user and the virtual object in accordance with the suspended synchronization of the state information.

12. The non-transitory computer readable medium of claim 8, further comprising computer readable code to:

in accordance with a detection of a commit action by the first device, providing additional state information for the first device, wherein the first representation of the multiuser communication session is configured to be synchronized with the second representation of the multiuser communication session in accordance with the additional state information.

13. A system comprising:
one or more processors; and
one or more non-transitory computer-readable media comprising computer-readable code executable by the one or more processors to:
provide, at a first device, a first representation of a multiuser communication session in which the first device and a second device are active;
synchronize the first representation of the multiuser communication session at the first device with a second representation of the multiuser communication session at the second device by providing, to the second device, state information for the first representation of the multiuser communication session, wherein components of the multiuser communication session are presented consistently among the first device and the second device in accordance with the synchronization;

detect, at the first device, initiation of an interaction in the first representation of the multiuser communication session satisfying a synchronization suspension criterion; and in accordance with detecting the initiation of the interaction satisfying the synchronization suspension criterion, cease providing the state information to the second device to suspend synchronization, wherein the components of the first representation of the multiuser communication session and the second representation of the multiuser communication session are inconsistently presented in accordance with the first device ceasing to provide the state information.

14. The system of claim 13, wherein the state information comprises object state information associated with a presentation state of a virtual object in the multiuser communication session.

15. The system of claim 13, wherein the state information comprises user state information, and further comprising computer readable code to:

in accordance with detecting a change in location of a user of the first device, transmit updated user state information associated with an updated location to the second device.

16. The system of claim 13, further comprising computer readable code to:

in accordance with detecting completion of the interaction, obtain updated state information for the second device; and present an updated representation of the multiuser communication session in accordance with the updated state information for the second device.

17. The system of claim 13, further comprising computer readable code to:

in accordance with detecting completion of the interaction and determining that the first device is authorized to globally update a state of the multiuser communication session, transmit a current state of the first representation of the multiuser communication session for the first device to the second device.

18. The system of claim 13, further comprising computer readable code to:

in accordance with detecting the initiation of the interaction, transmit an indication of the suspended synchronization of the state information to the second device.

19. The system of claim 13, wherein the interaction comprises an interaction between a user of the first device and a virtual object, and wherein a representation of the user and the virtual object in the multiuser communication session at the second device is inconsistent with the interaction of the user and the virtual object in accordance with the suspended synchronization of the state information.

20. The system of claim 13, further comprising computer readable code to:

in accordance with a detection of a commit action by the first device, providing additional state information for the first device, wherein the first representation of the multiuser communication session is configured to be synchronized with the second representation of the multiuser communication session in accordance with the additional state information.

* * * * *